Dec. 2, 1930.  L. SIROTEK  1,783,264
MIXING VALVE
Filed Sept. 8, 1928
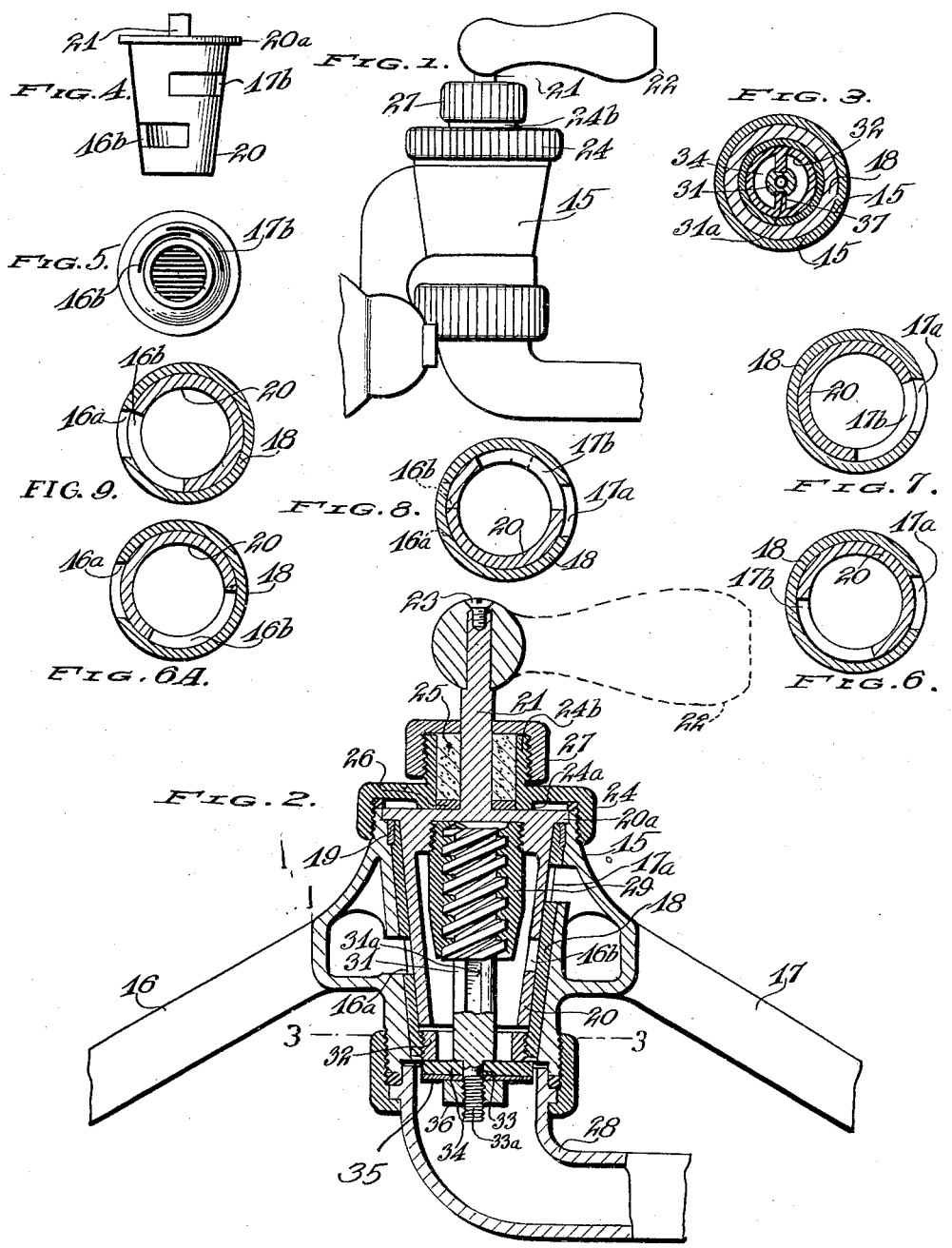
INVENTOR:—
LOUIS SIROTEK
BY Milo B. Stevens Co.
ATTORNEYS Patented Dec. 2, 1930

1,783,264

UNITED STATES PATENT OFFICE

LOUIS SIROTEK, OF CHICAGO, ILLINOIS

MIXING VALVE

Application filed September 8, 1928. Serial No. 304,761.

My invention relates to valves designed for the passage of fluids, and more particularly to faucet valves receiving hot and cold water, and my main object is to provide a novel valve of this kind which by means of a single handle will dispense either hot or cold water, or both.

A further object of the invention is to so design the novel valve that the mixture of hot and cold water may be varied by the control of a single handle, whereby to obtain a warmer or cooler mixture.

A still further object of the invention is to incorporate in the novel valve a tapered plug operating unit which by the peculiarity of its form forms a snug fitting in the element in which it seats, precluding leakage.

Another object of the invention is to incorporate in the operating assembly a novel compression stopper, which when the valve is closed acts as a positive shut-off to prevent possible leakage or a dripping tendency.

A significant object of the invention is to incorporate in the housing for the valve a novel lining element to receive the operating element and thus be easily replaced without prejudice to the housing in case excessive wear results from long use.

A final, but nevertheless important object of the invention is to construct the novel valve in a rugged and compact assembly to occupy a minimum amount of room, and prove a durable piece of mechanism.

With the above objects in view and any others which may suggest themselves from the description and claims to follow a better understanding may be gained by reference to the accompanying drawing, in which—

Figure 1 is a side elevation of a typical faucet embodying the novel valve;

Figure 2 is an enlarged frontal section of the faucet, showing the valve mechanism and indicating by dotted lines a lateral position of the handle;

Figure 3 is a section on the line 3—3 of Figure 2;

Figure 4 is an elevation of the main operating element;

Figure 5 is a bottom plan view of the showing in Figure 4; and

Figures 6, 6a, 7, 8 and 9 are, respectively, horizontal sections of the various elements of the main valve, showing their positions during various steps in the operation of the same.

I am familiar with the fact that many departures have been attempted in the past to centralize the dispensing of hot and cold water in a singly-controlled faucet for the purpose of saving material, room, and labor, but the apparent absence of an efficient device for this purpose on the market is evidence that most attempts did not meet with success. A valve for this purpose must not be so involved as to demand an excessive price or be subject to disorder or unsatisfactory conditions in operations and handling; also, the valve must have proper provisions against leakage caused by wear and the corrosive effect of minerals or acids in the water. Especially is the item of leakage of importance when hot water is concerned, it being a familiar fact that hot water faucets are most subject to leakage. It has been my intention to eliminate the deficiencies of past constructions in the above respects, and provide a valve which accomplishes the above-outlined objects to their fullest extent.

By a more specific reference to the drawing, it will be seen that the faucet housing is denoted by the numeral 15, and that the hot and cold water leads 16 and 17 enter the same from opposite sides as clearly shown in Figure 2. The housing 15 is bored vertically to form a conical chamber with which the leads 16 and 17 communicate at different levels, the lead 17 entering at a higher level than the lead 16.

In the housing snugly seats a conical sleeve 18, which is intended to form a liner for the wall of the housing and receive the wear of the valve. Thus, in case the liner has received excessive wear, the housing need not be disturbed, but only the liner removed and replaced. The liner 18 is secured from turning by a number of keys 19 lodged between its upper edge and the wall of the housing as clearly shown in Figure 2.

The main operating element of the valve is a conical plug 20, which is fitted into and ground to hermetically seat in the liner 18. The plug has an upwardly extending stem 21, which receives a typical faucet handle 22, the latter being secured by a screw 23 as is the usual practice. The plug 20 is enlarged with a top marginal flange 20a which overlies the top edge of the liner 18 and is in touch with the same, or practically so, when the plug has been properly ground into the liner.

The plug 20 is held in its seat by the pressure of a housing cap 24, which screws upon the threaded upper portion of the housing as shown and is slightly extended within, as indicated at 24a, to bear upon the plug 20 as the cap is screwed down to such an extent as will seat the plug yet permit it to be rotated without difficulty. The housing cap 24 has an upward central extension 24b within which are a cylinder of packing 25 and a washer 26. The extension 24b is also externally threaded to receive a cap nut 27. The latter is intended to crowd the packing in the extension to prevent what leakage may develop in that region; and the metal washer 26 is positioned between the packing and the top of the plug 20, its purpose being to shield the packing from curling tendencies it might suffer, were it directly in contact with the rotating plug 20.

The liner 18 is cut with openings 16a and 17a in registration with the openings in the housing 15 corresponding to the respective water leads 16 and 17. While the openings 16a and 17a are at different heights, they are diametrically opposite each other, and limited in lateral extent to the area of the inlet from the respective leads. The plug is in the nature of an inverted cup, and its walls are also perforated with ports 16b and 17b corresponding in height to the liner openings 16a and 17a. The peripheral length of the ports 16b and 17b is approximately 115 degrees, and in the same sense the ports overlap to a partial extent. The positions of the ports 16b and 17b may be clearly seen in Figures 4 and 5, the effect of their arrangement being emphasized by illustrating the ports as heavy black lines in Figure 5. The arrangement of the ports is designed to bring about the different dispensing incidents suggested above, that is, the dispensing of cold or hot water or mixtures thereof at various temperatures. Figures 6 to 9 illustrate schematic sections of the plug 20 and the liner 18 at heights which best illustrate the action of the valve. Thus, Figure 6 shows the relation of the cold water port 17b as against the cold water inlet 17a. Here it is seen that the inlet is barred and that the valve is therefore closed to cold water. This condition is indicated by the frontal position of the faucet handle 22, as shown in Figure 1. Figure 6a is coincident with Figure 6, but at the level of the hot water inlet 16a, showing the valve closed to hot water as well.

Figure 7 shows the plug turned through approximately 90 degrees in a counter-clockwise direction, this placing the cold water port 17b in registration with the cold water inlet 17a and admitting a full charge of cold water into the interior of the plug to descend into the discharge spout 28. During the above action, the hot water port 16b has moved to a more remote position from the hot water inlet 16a.

In order to secure a mixture of cold and hot water, the plug is further turned through a course of approximately 90 degrees, so as to create a condition illustrated in Figure 8. Here the cold water port 17b is but partly in registration with the cold water inlet 17a; and the hot water port 16b is also but partly in registration with the hot water inlet 16a. Thus, the above inlets have access into the chamber within the plug 20, and a mixture of hot and cold water is dispensed. By slightly moving the handle in one or the other directions, the proportions of the streams may be varied to raise or lower the temperature of the mixture as may suit the desire.

By operating the plug through another quarter turn, the condition in Figure 9 at the hot water level is secured. Here it will be seen that the hot water port 16b is fully in registration with the hot water inlet 16a, so as to cause the dispensing of hot water only, the cold water port having departed by this time from registration with the cold water inlet.

Thus, the faucet handle 22 has been operated through three-fourths of a turn, its positions being summarized as follows: initial position, closed; first quarter-turn, cold water; second quarter turn, a mixture of hot and cold water; and third quarter turn, hot water. To close the valve, it is simply swung back through the three-quarter turn to the initial position.

On general principles, the valve as constructed above will perform its functions efficiently; however, due to the tendencies for leakage as mentioned in a foregoing section, I have added an auxiliary valve which positively creates a shut-off against any possible leakage when the main valve is closed. The auxiliary valve applies to the open bottom of the liner 18, and is designed to close such bottom when the plug valve is in the closed position.

To describe the auxiliary valve, it will be noted that the head portion of the plug 20 receives by a tightly screwed connection a depending nut 29. Within this nut is a traveling screw 30 with a downwardly extended shank 31. This shank passes down into the center of a ring 32 which is tightly screwed into the lower end of the liner 18, and continues in the form of a reduced stem 33. The latter receives below the ring 32 a composition disk 34, with a metal backing plate 35, and is threaded as indicated at 33a to receive a nut 36 next below the plate 35. The screw 30 is non-rotatably disposed by having its shank 31 cut with longitudinal grooves 31a on opposite sides, these grooves receiving ribs 37 inwardly extended from diametrically-opposite points in the ring 32. Thus, the screw shank 31 may descend through the ring 32 when the screw travels in a downwardly direction, but the peculiar connection of the shank with the ring will prevent the screw from turning.

The composition disk 34 is designed to act as a shut-off against the under side of the ring 32 when the traveling screw 30 is at the upper end of its course, as shown in Figure 2. This condition corresponds to the initial position of the faucet handle 22, as per Figure 1. Now, when the faucet handle is turned to describe the course previously outlined for the accomplishment of the functions of the valve, the traveling screw is caused to descend, permitting the water which descends in the plug 20 to flow through the ring 32 and into the spout 28. As the faucet handle is swung further and further, so does the auxiliary valve formed by the disk 34 descend lower and lower, until the faucet handle has been swung to its limit. However, when the faucet handle is swung back so as to return to its initial position, the screw 30 will be caused to rise, so that when such initial position has been reached, the valve 34 has assumed a tight position against the under side of the ring 32. Thus, should leakage develop in the main valve, it will be positively stopped by the compression shut-off at the side of the auxiliary valve 34.

A valve is thus had which not only apportions the two streams of the fluid for selective or joint delivery, but also provides a stopper which is of a design commonly acknowledged as positive and dependable.

As illustrated, the valve is of a design which permits quick assembly or dismantling for purposes of inspection or other attention. The fact that the plug valve is of a conical design facilitates the grinding of the same into a seat to secure the highly efficient closure, so as to anticipate the question of leakage in a general way. Also, the valve is constructed with relatively few and simple parts of a rugged construction so that it may continue in use for long periods without disorder or need of attention. Further, no delicate parts occur, such as springs or minor controls which are apt to get out of order or necessitate special skill when repairs are required. The valve is on such simple lines that any ordinary mechanic could take the same apart with ease and ascertain its condition.

While I have illustrated and described my invention in the preferred form, it will be seen that the same is capable of many minor changes and refinements, and it is my intention to claim such changes and refinements as coming within the spirit and scope of the appended claims.

I claim:

1. A faucet comprising a housing, conduits leading a fluid thereinto, a rotary valve in the housing to control the fluid and having an internal passage, a discharge spout leading from the latter, and a stopper between said passage and the spout effective upon said passage when the rotary valve is moved in one direction to closed position to shut off entry to the housing of said fluid from said conduits.

2. A faucet comprising an upright housing, conduits leading a fluid thereinto, a rotary valve of inverted-cup form operable in said housing to control the fluid, a discharge spout leading from the bottom of the housing, and a compression stopper opposite said bottom and seating thereon to cut off communication between the rotary valve and the spout when the rotary valve is moved in one direction to closed position to shut off entry to the housing of said fluid from said conduits.

3. A faucet comprising a housing, conduits leading a fluid thereinto, a rotary valve in the housing to control the fluid and having an internal passage, a discharge spout leading from the latter, a stopper between said passage and the spout, a traveling screw carried by the stopper, and a nut carried by the valve in mesh with the screw, the closing operation of the valve in one direction relative to said conduits moving the screw to locate the stopper in a position to shut off the said passage from the spout.

4. A faucet comprising an upright housing, conduits leading a fluid thereinto, a rotary valve of inverted-cup form operable in said housing to control the fluid, a discharge spout leading from the bottom of the housing, an annular shoulder internally of the housing between the valve and the spout, a compression stopper opposite said shoulder, a traveling screw carried by the stopper, and a nut carried by the valve in mesh with the screw, the closing operation of the valve in one direction relative to said conduits moving the screw to seat the stopper upon said shoulder and shut off the valve from the spout.

5. A faucet comprising an upright housing, conduits leading a fluid thereinto, a rotary valve of inverted-cup form operable in said housing to control the fluid, a discharge spout leading from the bottom of the housing, an annular shoulder internally of the housing between the valve and the spout, a compression stopper opposite said shoulder, a traveling screw with longitudinal grooves carried by the stopper, a fixed guide for the screw, ribs extended from the guide into the grooves of the screw to non-rotatably dispose the latter, and a nut carried by the valve in mesh with the screw, the closing operation of the valve in one direction relative to said conduits moving the screw to seat the stopper upon said shoulder and shut off the valve from the spout.

6. A faucet comprising a housing, a conoidal liner with a substantially vertical axis lodged in the same, a plug valve of inverted-cup shape seated in the liner and terminating short of the lower and thereof, a nut in the head of the valve, a traveling screw in mesh with the nut and depending from the valve, said nut having longitudinal grooves, a substantially horizontal ring in the lower end of the liner, ribs directed from the ring into the grooves of the screw for the non-rotatable guidance of the latter, and a disk-valve carried by the lower end of the screw and adapted to seat in upward direction upon the under side of the ring.

In testimony whereof, I affix my signature.

LOUIS SIROTEK.